United States Statutory Invention Registration [19]

[11] Reg. Number: H833

Brindle [43] Published: Nov. 6, 1990

[54] PROTECTIVE HELMET VISOR FOR USE WITH VISION ASSISTING DEVICES

[75] Inventor: James H. Brindle, Doylestown, Pa.

[73] Assignee: The United States of America as represented by the Secretary of the Navy, Washington, D.C.

[21] Appl. No.: 205,713

[22] Filed: Jun. 9, 1988

[51] Int. Cl.[5] ..... A42B 1/08; A42B 3/02

[52] U.S. Cl. ..... 2/424; 2/6; 2/10; 2/427

[58] Field of Search ..... 2/6, 10, 424, 425, 427

[56] References Cited

U.S. PATENT DOCUMENTS

| | | | |
|---|---|---|---|
| 2,270,238 | 1/1942 | Clarke et al. | 2/6 X |
| 2,365,779 | 12/1944 | Schwab . | |
| 3,298,031 | 1/1967 | Morgan . | |
| 4,156,292 | 5/1979 | Helm et al. . | |
| 4,229,836 | 10/1980 | Stinger | 2/10 X |
| 4,250,577 | 2/1981 | Smith . | |
| 4,315,335 | 2/1982 | Kennedy, Jr. et al. | 2/424 |
| 4,457,461 | 7/1984 | Docking et al. . | |
| 4,577,347 | 3/1986 | Connon . | |

FOREIGN PATENT DOCUMENTS

| | | | |
|---|---|---|---|
| 2331772 | 1/1974 | Fed. Rep. of Germany | 2/424 |
| 3427692 | 1/1986 | Fed. Rep. of Germany | 2/10 |
| 2155762 | 10/1985 | United Kingdom | 2/6 |

*Primary Examiner*—Thomas H. Tarcza
*Assistant Examiner*—Linda J. Wallace
*Attorney, Agent, or Firm*—Susan E. Verona; John M. O'Meara

[57] ABSTRACT

A face protecting visor is provided for use when wearing optical devices with a helmet. A clear viewing portion of the visor is retained in the helmet by a bezel portion which extends structurally to bear against the outer surface of the helmet, thereby translating impact forces thereagainst to the helmet rather than the face. Included on the visor is one mating part of a catch mechanism located on the bezel portion for detachably affixing the optical devices thereto. Elastic members with snaps are also connected to the bezel portion for removably securing it to the helmet. A catch-stop mechanism on the interior of the bezel portion translates the gravitational loads of the visor to the helmet.

6 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROTECTIVE HELMET VISOR FOR USE WITH VISION ASSISTING DEVICES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a protective helmet visor and more particularly such a visor which transmits impact forces thereagainst directly to the helmet while vision assisting devices are being utilized with the helmet. On occasion, aircraft pilots need a see-through, protective visor, such as when a wind blast, crash, birdstrike, or other impact from fragment occurs. This is true especially for military pilots of either fixed or rotary wing aircraft, who are often exposed to such hazards during routine flight conditions or when ejecting from fixed wing aircraft.

Frequently pilots are also equipped with vision assisting devices, such as night vision goggles, which presently render the design of protective visors less than optimum. Conventional protective helmet visors are of the helmet covering type and can not be utilized with vision assisting devices due to design constraints which preclude the close proximity required between such vision assisting devices and the eyes. One approach that has been utilized for overcoming this problem is a clear shield configured for disposition close the pilots face and for passing thereover from under the helmet in the forehead and temple regions to an oxygen mask which secures and positions the shield. However, impact forces against this clear shield are born directly by the face rather than the helmet which of course is a matter of great concern to pilots. Also, if the shield is crazed by impacting fragments or vision therethrough is otherwise obscured, such as by birdstrike, the shield cannot be removed without losing oxygen capability. Furthermore, since communications with the pilot are commonly accomplished through the oxygen mask, such communications would be lost along with the oxygen capability. Of course, even when the vision through this shield is not obscured, it is a great nuisance to pilots during preflight operations when the oxygen mask only has to be positioned for purposes of communications.

SUMMARY OF THE INVENTION

It is the general object of the present invention to provide a protective helmet visor which is readily removable from the helmet and transmits impact forces thereagainst directly to the helmet, while being disposed in close proximity to the eye region of someone wearing the helmet so that vision assisting devices may be utilized therewith.

It is a specific object of the present invention to provide a protective helmet visor in accordance with the above stated general object and which includes provisions thereon for detachable affixment of vision assisting device.

It is another specific object of the present invention to provide a protective helmet visor in accordance with the above stated general object and which includes elastic members thereon as means for providing the detachable affixment thereof to the helmet.

It is a further specific object of the present invention to provide a protective helmet visor in accordance with the above stated general object and which includes thereon means for transferring the gravitational loads thereof to the helmet.

These and other objects are accomplished using the design concept of this invention by configuring the protective helmet visor to have a clear viewing portion recessively disposed within a bezel portion, so that the clear viewing portion is locatable inside the helmet in close proximity to a persons face, especially the eye region, with the bezel portion bearing against the exterior surface of the helmet. Means for detachably affixing vision assisting devices may be disposed on the protective helmet visor when an integration therebetween is desirable. Cooperating bearing blocks may be separately disposed on the helmet and the protective helmet visor to translate the gravitational load of the protective visor to the helmet. Readily detachable affixment of the protective visor to the helmet is accomplished economically with elastic bands.

The scope of the present invention is only limited by the appended claims for which support is predicated on the preferred embodiments hereinafter set forth in the following description and the attached drawings wherein like reference characters refer to like elements throughout the several figures.

DESCRIPTION OF THE PREFERRED EMBODIMENTS

Figure 1:
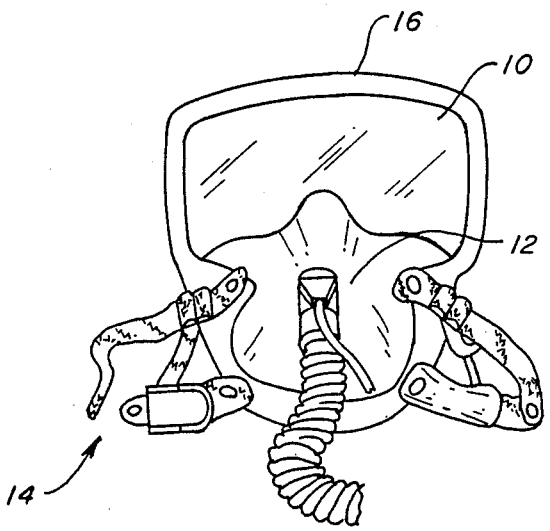
FIG. 1 PRIOR ART
FIG. 1 is a frontal view of a prior art protective visor system in which a clear shield is secured and positioned with an oxygen mask.
Figure 2:
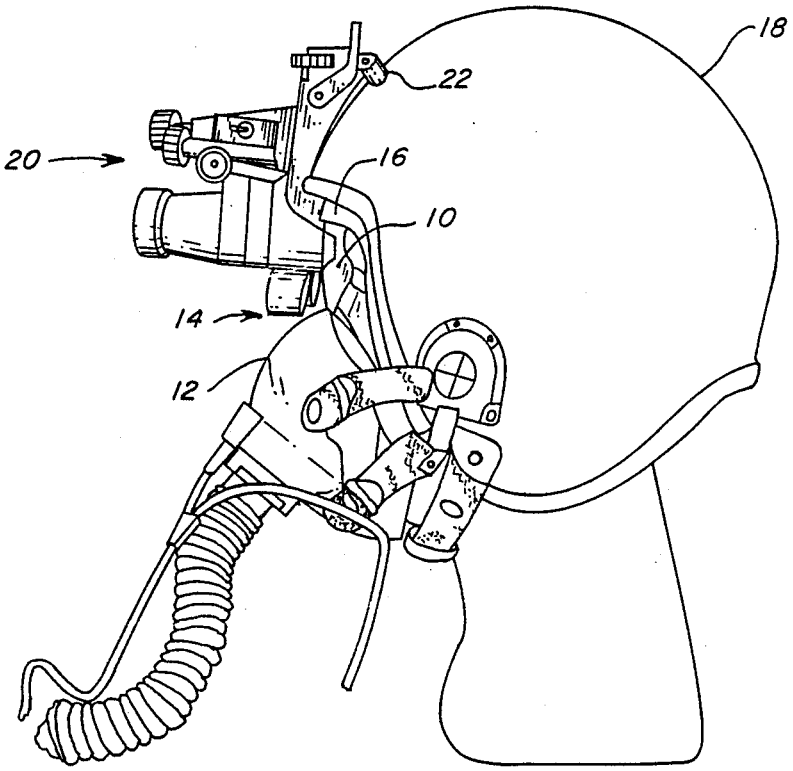
FIG. 2 PRIOR ART
FIG. 2 is a profile view of a mannequin wearing a helmet having a vision assisting device attached thereto and showing the oxygen mask-shield system of FIG. 1 in use therewith.

Visors are often worn with helmets, such as by aircraft pilots, to protect the face from airborn debris. When optical devices, such as vision assisting apparatus are utilized with helmets, these protective visors must be located in close proximity to the face, especially in the eye region, because a relatively short distance usually must be maintained between the eyes and the optical devices. One prior art design for providing such protection is shown in FIG. 1 where a clear shield 10 and an oxygen mask 12 are integrated into a single unit 14 through the use of a rigid bezel 16. As shown in FIG. 2, this shield-mask unit 14 fits under the helmet 18 and extends over the face. Consequently, any impact forces against the shield-mask unit 14 are borne by the face, to the great consternation of many pilots. In FIG. 2, an optical device 20 is detachably affixed to the helmet 18 at location 22 thereon.

Figure 3:
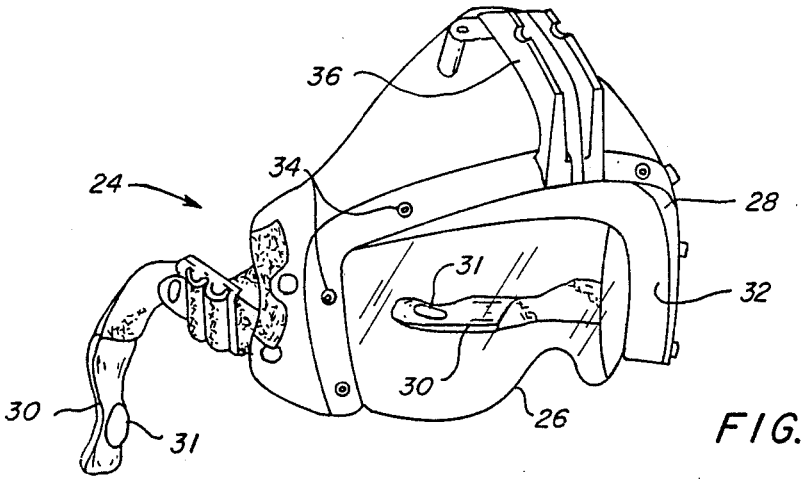
FIG. 3 is an isometric view of a protective visor that is fabricated in accordance with one embodiment of the invention.
Figure 4:
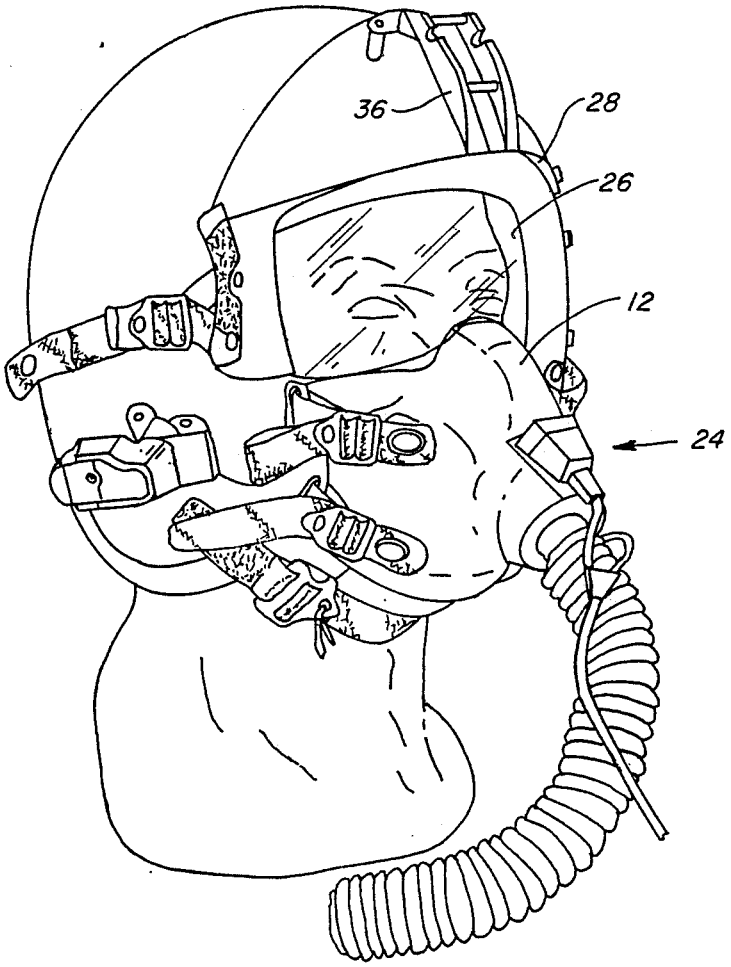
FIG. 4 is a profile view of a mannequin wearing a helmet having an oxygen mask affixed thereto and showing the protective visor of FIG. 3 in use therewith.

As one embodiment of the invention, a visor 24 for protecting the face when using optical devices 20 while wearing the helmet 18 is shown in FIG. 3. Although this visor 24 is securable to the helmet 18 as shown in FIG. 4, it is readily removable therefrom and structurally independent thereof or any device utilized therewith, such as the oxygen mask 12. Optical devices 20 may be affixed thereto if desired, as will be discussed hereinafter.

The visor 24 is structured to provide means for translating impact forces thereagainst directly to the helmet 18 so that the face is completely unaffected by such forces. This structure includes a clear viewing portion 26 for disposition in close proximity to the eyes at a recessed location within the helmet 18, and a bezel portion 28 for retaining the viewing portion 26 while extending structurally to bear against the outer surface of the helmet 18. Consequently, structural integrity of the bezel portion 28 must be maintained between the viewing portion 26 within the helmet 18 and the outer surface of the helmet 18. In the visor 24 of FIG. 3, such structural integrity is maintained through a spacer 32. Fasteners 34, such as rivets or screws, are utilized to assemble the visor 24, however, an adhesive could also be utilized for this purpose.

Means for removably securing the bezel portion 28 to the helmet 18 is also included on the visor 24. Although this securing means could be implemented in various ways, for the FIG. 3 embodiment of the invention, elastic members 30 each having one end thereof connected to the bezel portion 28 and one part 31 of a snap fitting disposed at the other end thereof, are utilized. The elastic members 30 allow for the visor 24 to be removed from over the face by pulling it straight out until the viewing portion 26 is clear of the helmet 18. Then the bezel portion 28 may be relocated, such as on top of the helmet 18, or removed from the helmet 18 by separating the parts of the snap fittings.

Figure 6:
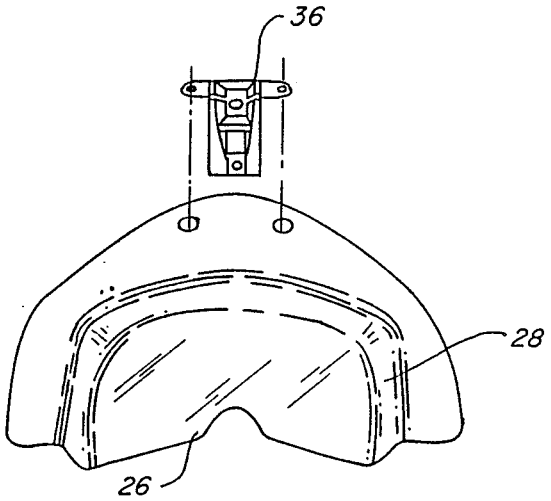
FIG. 6 is a frontal view of a single piece protective visor that is configured in accordance with another embodiment of the invention.

It should be realized by those skilled in the art without any further explanation that the viewing and bezel portions 26 and 28 of the visor 24 could be injection molded in a single piece, as shown in FIG. 6. Contours to comply with various facial characteristics could be disposed on both the viewing portion 26 and the spacer 32 to provide a more precise fit. Furthermore, visors 24 having various gradations of such contours could be stocked where a large number of persons are to be supplied with visors 24, such as for military pilots.

Figure 5:
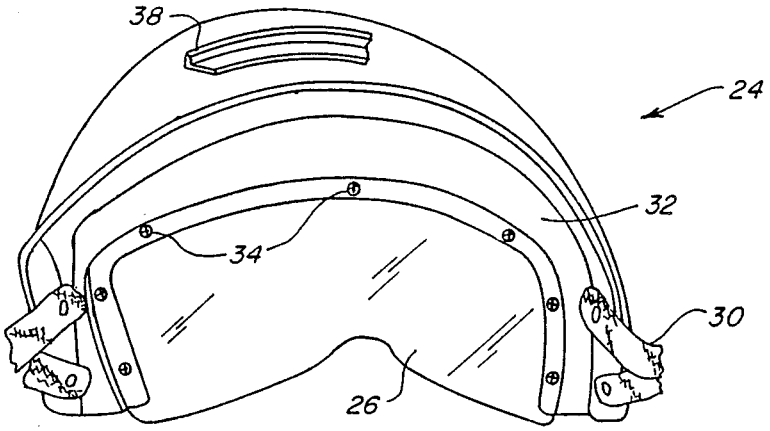
FIG. 5 is a rear isometric view for the protective visor of FIG. 3 and showing a bearing block disposed thereon through which gravitational loads are transferred to the helmet.

Although the bezel portion 28 may be configured to permit utilization of the visor 24 when optical devices 20 are mounted on the helmet 18, means 36 for detachably affixing optical devices 20 may be disposed on the bezel portion 28. As shown in FIGS. 3 and 6, this affixing means 36 may be one mating part of a catch mechanism which is located on the bezel portion 28 at a position over the forehead of the person wearing the helmet 18. Of course, gravitational forces on the visor 24 may cause it to drop relative to the helmet 18, especially if optical devices 20 are mounted thereon. To prevent this, one part of a catch-stop mechanism, such as a bearing block 38 is disposed on the interior of the bezel portion 28, as shown in FIG. 5, for interfacing with another part of the catch-stop mechanism, such as another bearing block (not shown) on the exterior surface of the helmet 18.

Those skilled in the art will appreciate without any further explanation that many modifications and variations are possible to the above disclosed helmet visor embodiments, within the concept of this invention. Consequently, it should be understood that all such modifications and variations fall within the scope of the following claims.

What I claim is:

1. In a visor for protecting the face when using optical devices while wearing a helmet to which said visor is readily removable, the improvement comprising:

means for translating impact forces against said visor to the helmet.

2. The visor of claim 1 wherein said force translating means includes:

a clear viewing portion for disposition in close proximity to the eyes at a recessed location within the helmet; and a bezel portion for retaining said viewing portion and structurally extending to bear against the outer surface of the helmet when said visor is secured thereto.

3. The visor of claim 2 wherein means is included for removably securing said bezel portion to the helmet.

4. In a helmet of the type having a readily removable visor for protecting the face when using optical devices while wearing said helmet, the improvement comprising:

means for translating impact forces against said visor to said helmet.

5. The helmet of claim 4 wherein said force translating means includes:

a clear viewing portion for disposition in close proximity to the eyes at a recessed location within the helmet; and a bezel portion for retaining said viewing portion and structurally extending to bear against the outer surface of said helmet when said visor is secured thereto.

6. The helmet of claim 5 wherein means is included for removably securing said bezel portion to said helmet.

* * * * *